United States Patent Office 3,376,302
Patented Apr. 2, 1968

3,376,302
PROCESS FOR THE PRODUCTION OF CHLORAMINO-s-TRIAZINES
Theodor Grauer, Arlesheim, Basel-Land, Switzerland, assignor to J. R. Geigy A.G., Basel, Switzerland
No Drawing. Filed Feb. 7, 1966, Ser. No. 525,382
Claims priority, application Switzerland, Feb. 19, 1965, 2,328/65
8 Claims. (Cl. 260—249.5)

The present invention concerns a new process for the production on an industrial scale of chloramino-s-triazines containing one or, preferably, two amino groups in the molecule, which amino groups are preferably substituted by organic radicals.

In the known processes for producing such compounds at least one chlorine atom in the cyanuric chloride molecule is exchanged for an ammonia radical or for a radical of a water soluble primary or secondary, preferably aliphatic, amine.

It is, moreover, known to carry out the production of 2,4-dichloro-6-amino-s-triazines and 2-chloro - 4,6-bis-amino-s-triazines which are substituted, preferably in the amino groups, by organic radicals (simply termed in the following "chloramino-s-triazines") by the known reaction of cyanuric chloride with ammonia or amines in an aqueous reaction medium containing an organic solvent or diluent or mixture of solvents which is inert to the reaction components and in the presence, in the reaction medium, of an acid binding agent.

Solvents which have hitherto been mentioned are, preferably, diethyl ether, dioxan, diethyl Cellosolve, benzene, chlorobenzene, and the aqueous reaction media which have been mentioned are, on the one hand, aqueous monophase systems the components of which have unlimited miscibility with each other such as water-acetone, water-dioxane, and, on the other hand, two-phase systems the components of which have practically no miscibility with each other such as water-benzene, water-chlorobenzene [cf. R. L. Metcalf (edit.) Advances in Pest Control Research, Vol. III, Intersc. Publ., New York, 1960, page 296].

However, of these known two-phase systems, those of water-benzene and water-chlorobenzene are not usable on an industrial scale, since the reaction velocities are far too slow and, moreover, cooling to a temperature of 0° to —15° C., which is necessary when exchanging the first chlorine atom of the cyanuric chloride molecule for an amino group in order to avoid undesirable formation of byproducts due to hydrolysis, cannot be achieved.

The system of water-acetone has therefore been used predominantly for production on an industrial scale. However, this system and also the further recommended system of water-dioxan suffer from a number of other drawbacks, which are explained further below. This industrial process involves dissolving cyanuric chloride in a large amount of acetone, e.g. 10 to 20 times the amount has been proposed, adding water at 0° C. to the solution, and then adding to the reaction mixture the water-soluble amine and an acid binding agent, sodium hydroxide, sodium carbonate, sodium bicarbonate or a molar excess of the aforesaid amine being preferably used.

Since external cooling is technically more complicated and also would not be satisfactory due to the exothermic nature of the reaction and danger of local overheating, the necessary low reaction temperature is attained by the addition of ice in the reaction medium.

At the end of the first amination step, in this known industrial process, a reaction product can be isolated which, in addition to the desired 2,4-dichloro-6-amino-s-triazine and, at this stage, undesired 2-chloro-4,6-bis-amino-s-triazine, also contains starting material, trisamino-s-triazine and hydrolysis products. The purification of the desired dichloro-amino-s-triazines from such mixtures is very complicated and uneconomical.

On completion of the first step, a further mol of either the same or another amine is continuously added or liberated by means of adding alkali, in order to produce the corresponding 2-chloro-4,6-bis-amino-s-triazines. As reaction product of this second stage, the desired 2-chloro-4,6-bis-amino-s-triazine compound is obtained together with non-reacted material and hydrolysis products. If different amines are consecutively used for the exchange of two chlorine atoms, then symmetrically substituted 2-chloro-4,6-bis-amino-s-triazine derivatives corresponding to each of these amines are also obtained as side products. Their amounts are the higher, the greater the content of 2-chloro-4,6-bis-amino-s-triazine in the reaction product of the first process stage, if no intermediate purification is carried out between the two stages.

The isolation of the desired reaction products from these side products is highly complicated and uneconomical. At the end of the reaction, the mixture of solvents has to be distilled off and this is another uneconomical factor in the technical production, for in the known process sufficiently anhydrous acetone cannot be regenerated economically from the water-acetone solvent mixture, and the distillate obtained can thus not be used again.

Moreover, according to Thurston et al., Journal Am. Chem. Soc., 73, p. 2981 et seq. (1951), the reaction which takes place in the aqueous phase is incomplete unless the cyanuric chloride used is in finely divided form. For this purpose a solution thereof in practically anhydrous acetone or dioxane is poured into ice water so as to produce a freshly precipitated suspension of cyanuric chloride.

In view of the fact that the chloramino-s-triazines are themselves important herbicides and at the same time intermediate products for the production of other herbicides, pest control agents, dyestuffs, pharmaceuticals, optical brightening agents and other substances, the industry has searched for an improved process which would be economical to work. It was, therefore, of special importance to develop a process by which chloramino-s-triazines could be obtained in high yields and high grade purity by simplified, industrially applicable and economic methods.

These objects are attained by the process according to the invention, which comprises, in the production of chloramino-s-triazines containing one or, particularly, two, preferably substituted amino groups in the molecule, by exchanging at least one chlorine atom in the cynauric chloride molecule for the radical of a primary or secondary amine in an aqueous reaction medium and in the presence of an acid binding agent, the improvement of performing the reaction of the cyanuric chloride with ammonia or with the aforesaid amine as defined above in a mixture of water and a partly water-soluble organic solvent having a boiling range from 50 to 120° C. and which is inert to the reaction partners, and preferably in a mixture of water and methylethyl ketone; the amine must be soluble in at least one of the two foregoing components of the reaction medium.

As partly water-soluble organic solvents having a boiling range from 50 to 120° C. and which are inert to the reaction partners, particularly aliphatic ketones are used such as, principally, methylethyl ketone, also methyl-n-propyl ketone, methylisopropyl ketone and diethyl ketone.

Acid binding agents which are used for the process according to the present invention are the oxides, hydroxides, carbonates and bicarbonates of alkali metals which have been used for known analogous processes, as well as at least one molar excess of the corresponding amine used for the exchange of the first chlorine atom in the cyanuric chloride molecule.

According to a preferred embodiment of the process according to the invention, commercial grade cyanuric chloride is stirred into a mixture of the above defined solvent, e.g. methylethyl ketone and ice, whereupon the ice melts, while the major part of the cyanuric chloride is dissolved in the methylethyl ketone; particularly large granules of the cyanuric chloride remain initially undissolved in the methylethyl ketone-water mixture. At the same time, the temperature of the mixture falls below 0° C. and usually to about −6 to −8° C. Then, either double the molar amount of amine in the form of an aqueous solution, of which half serves as acid binding agent, is added, preferably rapidly, or first a single molar amount of amine, as aqueous solution or suspension, and then a single molar amount of an acid-binding alkaline compound are added, again preferably in a short time, both additions being made in batches and preferably without excess, while stirring well, whereupon the reaction takes place. During the reaction the pH should be at all times below 7. At the end of the reaction, the reaction mixture consists of two clear phases or, depending on the nature of the reaction product formed at this stage, a turbid emulsion or suspension, and the temperature should then be at −3° C. or lower in the case of aromatic amines, or it may have to be raised to about 20–30° C. in the case of aliphatic amines.

It is a primary advantage of the improved process according to the invention that technical grade cyanuric chloride of the usual particle sizes can be used for this process. Such technical grade cyanuric chloride contains 5 to 10% by weight or more of particles having sizes of about 200 and up to 1000 microns.

There is no need to grind such technical grade material to eliminate the coarser particles and to obtain sizes in the order of 50 to 100 microns only, or to effect first a dissolution and then a reprecipitation of this starting material.

It is another advantage of the process according to the invention that, at the end of the reaction, the organic solvent, e.g. methylethyl ketone, can be distilled off as azeotropic mixture with water and that such mixture can be used again directly in a subsequent reaction. Losses of the organic solvent are thus kept at a minimum, usually less than 5% by weight.

Another advantage of the new process is that the reaction equilibrium between the cyanuric chloride and the amine is shifted strongly in favour of the desired end product, so that dichloroamino-s-triazines are obtained in such good yield rates and are of such high grade purity that complicated and thus uneconomical purifying operations are avoided, while these are required when using acetone, dioxane, benzene or other solvents in the known processes.

The dichloramino-s-triazines so obtained can be reacted direct to form chloro-diamino-s-triazines without intermediate isolation. Consequently, the production of 2-chloro-4-amino-6-amino-s-triazines having different substituents in the two amino groups is possible by the simple addition of an aqueous solution of the second, different amine and acid binding agent to the reaction mixture of the first stage; if, in the first step, an excess of amine has served as acid binding agent, chloro-diamino-s-triazines having the same substituents in both amino groups can be obtained by the simple addition of an alkaline substance, e.g. sodium hydroxide or sodium carbonate as acid binding agent.

The process according to the present invention serves in particular for the production, on an industrial scale, of amino-s-triazine derivatives of the formula

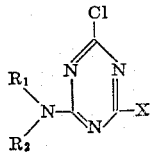

(I)

wherein
$R_1$ represents a lower molecular alkyl or alkenyl radical or the cyclohexyl radical,
$R_2$ represents hydrogen, a lower molecular aliphatic hydrocarbon radical the chain of which can be substituted by the hydroxyl group or by halogen or which can be interrupted by oxygen or sulphur,
$R_1$ and $R_2$ together with the adjacent nitrogen atom also represent the pyrrolidino, morpholino, pyridazino, or piperidino radical and
X represents chlorine, or particularly, a group

wherein $R_1$ and $R_2$ have the meanings given above.

Examples of water-soluble amines which can be used for the reaction according to the invention are, for instance, methylamine, dimethylamine, ethylamine, diethylamine, propylamine, isopropylamine, di-n-propylamine, methylpropylamine, ethylpropylamine, n-butylamine, sec. butylamine, isobutylamine, tert. butylamine, n-amylamine, sec. amylamine, isoamylamine, cyclohexylamine, allylamine, methallylamine, γ-methoxypropylamine, γ-ethoxypropylamine, β-methoxyethylamine, β-ethoxyethylamine, γ-propoxypropylamine, γ-isopropoxypropylamine, ethanolamine and propanolamine.

The chloro-diamino-s-triazine derivatives which can be produced according to the new process by exchanging two chlorine atoms of the cyanuric chloride, are excellent herbicidally active substances. They are also suitable as intermediate products for the production of other herbicides. Thus, on reaction with alcohols and thiols, the corresponding alkoxy- or alkylthio-substituted bis-amino-s-triazines can be obtained therefrom.

In this second stage it is also possible to introduce ammonia instead of an amine, and thereby to replace the second chlorine atom by the group —$NH_2$.

In lieu of the water soluble amines enumerated hereinbefore, other amines can also be introduced into the first or the second stage of the process according to the invention, whereby intermediates for the production of optical brighteners are obtained instead of the above-mentioned herbicides.

In a similar manner, dyestuff components and dyestuffs containing triazinyl groups which render them fiber-reactive, can be produced by the process according to the invention. In this case, dyestuff components or dyestuffs having at least one preferably unsubstituted amino group in their molecule are introduced into the first or into the second stage.

Amino compounds serving as optical brightener starting materials, dyestuff components or dyestuffs containing in their molecule at least one water-solubilizing group, e.g. a carboxylic acid or a sulfonic acid group, besides the above-mentioned amino substituent or substituents are preferred. These preferred amino compounds should be in free acid form when introduced into the first stage of the process according to the invention. When they are to be introduced into the second stage of the invention, they can be employed either in free acid form or in the form of their water-soluble salts, e.g. alkali metal salts.

Especially preferred amino-compounds of this type are amino-substituted stilbene-2,2′-disulfonic acids which are well known optical brightener starting materials, such well known dyestuff components as metanilic acid or naphthalene-sulfonic acids, e.g. H-acid, or amino-anthraquinone-sulfonic acids, or amino-substituted azo dyestuffs or amino-substituted anthraquinone dyestuffs.

The dichloramino-s-triazines obtained by reaction with one mol of amine of Formula I are suitable as intermediate products for the production of herbicidally active substances, e.g. by reaction with amines, alcohols or thiols.

On a large industrial scale, the process according to the invention is suitable, particularly as two-stage process to exchange two chlorine atoms of the cyanuric chloride molecule for corresponding amino radicals in the production of 2-chloro-4,6-bis-amino-s-triazine derivatives.

If difficulties are encountered in the isolation of the 2,4-dichloro-6-amino-s-triazine derivatives formed in the first process stage by exchanging the first chlorine atom for the radical of a water-soluble amine from their aqueous reaction medium, these are due to the fact that these products are easily hydrolisable.

The following comparison of yield rates and purity of products achieved by the process according to the invention with those of products obtained by the best known industrial process illustrate the technical progress achieved by my process, the production of 2-chloro-4-ethylamino-6-isopropylamino-s-triazine being used as example. Yield rates are in percent of the theoretical yield.

| (a) Reaction medium used | Acetone/water | Methylethylketone/water according to the invention |
|---|---|---|
| (b) Weight ratio of components in reaction medium | 1–0.88 | 1–0.88 |
| (c) Yield rate of 2-chloro-4-ethyl-amino-6-isopropyl-amino-s-triazine | 85.3 | 97.9 |
| (d) Purity of latter final product (in weight percent) | 97.9 | 99.6 |
| (e) Yield rate of 2-chloro-4,6-bis-ethylamino-s-triazine | 1.6 | 0.1 |
| (f) Yield rate of 2-chloro-4,6-bis-isopropylamino-s-triazine | 0.4 | 0.2 |
| Total yield rate of by-products (e)+(f) | 2.0 | 0.3 |

The above data are average values obtained from 20 runs.

Other known reaction media, e.g. dioxan/water or benzene/water give results which are far inferior to those obtained with acetone/water as reaction medium. Thus the yield rate of (c) with benzene/water is only 79.7% and the purity (d) only 86.1%, while with dioxan/water these data are only 60.0% and 63.5%, respectively.

The following non-limitative examples serve to illustrate the process according to the invention further. Where not otherwise stated, parts and percentages are given by weight and the temperatures are given in degrees centigrade.

Example 1

Methylethyl ketone, which dissolves up to 26.8% by weight in water at 20° whilst water is soluble up to 11.8% by weight at 20° in methylethyl ketone, is used as organic component in the reaction medium.

2800 parts of ice are added to 3200 parts of methylethyl ketone at a temperature of 15–20°. The temperature decreases to −4°. Then 1000 parts of technical grade cyanuric chloride are added while stirring vigorously. Immediately, with the temperature of the mixture at −4°, 457 parts of an aqueous 70%-isopropylamine solution are added in portions within 15 minutes while stirring strongly whereupon the inner temperature rises to 0 to +5°. 73 parts of an aqueous 30%-sodium hydroxide solution are added continuously within 15 minutes while stirring strongly with an impeller-type stirrer which whirls up initially undissolved cyanuric chloride, which settles in the bottom zone, into the upper zone of the reaction medium. At the end of the reaction the reaction medium separates into two zones; the upper phase, rich in methylethyl ketone, is clear and colorless or of only slightly yellowish color, while the lower phase is of higher water content. The temperature of the reaction mixture rises to 18 to 20°.

Thereupon, 488 parts of an aqueous 50%-ethylamine solution are immediately added within 15 minutes, while again stirring the reaction mixture very strongly in order to mix both aforesaid phases well. The pH should not be more than 8.5 (phenolphthalein pink). The temperature of the reaction mixture rises to 38 to 40°. 750 parts of an aqueous 30%-sodium hydroxide solution are added continuously within 15 minutes while stirring strongly to mix the said phases well throughout the reaction, whereupon the inner temperature rises to 50 to 60°. When addition is complete, the pH of the mixture is 10 to 11 and crystallization of the desired end product begins. The reaction mixture is then heated to 100° inner temperature and the methylethyl ketone is distilled off (distillation range 75 to 99°). 4000 parts by volume of water are added to the distillation residue. The suspension formed is filtered, washed free of sodium chloride with water, and the product is dried in vacuo for 10 hours. The yield of 2-chloro-4-ethylamino-6 - isopropylamino-s-trazine is 1130 parts (yield rate 96% calculated on cyanuric chloride).

Example 2

250 parts of cyanuric chloride are added to 700 parts of ice and 800 parts of a methylethyl ketone (density 20°=0.793) and the whole is stirred. A greater part of the cyanuric chloride dissolves. As soon as the temperature has dropped to 0 to −4° without external cooling (room temperature 25°), 204 parts of an aqueous 30% ethylamine solution are poured in within 10–12 minutes at −4 to +12° while stirring well. The remainder of the cyanuric chloride then dissolves. The pH rises to 7.2 to 7.5. Immediately afterwards, while stirring well, 180 parts of a 30% aqueous sodium hydroxide solution is poured in within 10–12 minutes at 12 to 32° and a pH of 6.5 to 7.5 whereupon complete solution is maintained and two phases are formed: upper layer: 2,6-dichloro-4-ethylamino-s-triazine; lower layer: aqueous sodium chloride with a little solvent.

Immediately afterwards, 115 parts of aqueous 70% isopropylamine solution are added to the above mixture within 10 minutes at 32–47° while stirring well. Then 180 parts of a 30% aqueous NaOH solution are poured in within 15 minutes, also while stirring well. Immediately before the end of the addition of alkali, the pH of the reaction mixture is 10–11. The 2-chloro-4-ethylamino-6-isopropylamino-s-triazine crystallises simultaneously without a positive heat effect. Well formed needles are formed. As soon as the crystallisation process is complete, the solvent is distilled off at a temperature range of 75–100°. The azeotropic mixture (about 88% ketone and 12% water) begins to distill at 75°. 1000 parts by volume of water are added to the distillation residue without external cooling whereupon the temperature drops from 95° to 60–65°. The aqueous suspension obtained which contains almost no solvent, is very quickly filtered. The residue is washed free of sodium chloride with 4000 parts by volume of water (silver nitrate sample negative), whereupon it is dried in vacuo at 80–110°. The yield of 2-chloro-4-ethylamino-6-isopropylamino-s-triazine is 283 parts=97% of the theoretical, calculated on the cyanuric chloride.

The cyanuric chloride used as starting material in this and in all subsequent examples is of technical grade and contains about 5 to 10% of particles of sizes between about 200 and 1000 microns.

It is necessary in this and all subsequent examples to stir the reaction mixture sufficiently strongly to transfer still undissolved cyanuric chloride tending to settle in the bottom zone of the reaction vessel, into the upper reaction zone and to intermingle intimately the two phases, one richer and one poorer in methylethyl ketone, which are being formed.

Example 3

2800 parts of ice are added to 3200 parts of methylethyl ketone at a temperature of 15–20°. The temperature drops to −4°. 1000 parts of cyanuric chloride are then added to the mixture and, while stirring well, 457 parts of a 70% aqueous isopropylamine solution are added dropwise whereupon the inner temperature rises to 0 to +5°. Without interruption, 730 parts of a 30% aqueous sodium hydroxide solution are added to the mixture within 15 minutes while stirring. On completion of the reaction, two phases are formed. The upper phase may be slightly yellowish coloured and must be almost clear. The inner temperature rises to 20-35°.

480 parts of a 35% aqueous methylamine solution are added to the above reaction mixture within 15 minutes while stirring well. The inner temperature rises to 38-40°. Without interruption, 743 parts of a 30% aqueous sodium hydroxide solution are then added dropwise within 15 minutes whereupon the inner temperature rises to 50-60°. At the end, the reaction mixture has a mimosa red reaction. The solvent is removed by heating until the inner temperature reaches 74°. Then, at 75 to 80°, half the solvent is removed and 4 parts of lignin sulphonate as 10% aqueous solution are added within 30 minutes. The remainder of the solvent is then distilled off. 4000 parts by volume of water are added to the residue. The suspension formed is filtered, the residue is washed free of NaCl and dried in vacuo for 10 hours. The yield of 2-chloro-4-isopropylamino-6-methylamino-s-triazine is 1000 parts = 92% of the theoretical, calculated on the cyanuric chloride.

Example 4

250 parts of cyanuric chloride are added to 700 parts of ice and 800 parts of methylethyl ketone and the whole is stirred, whereupon the greater part of the cyanuric chloride dissolves. As soon as the temperature has dropped to 0 to −4°, 244 parts of 50% aqueous ethylamine solution are poured in within 15-20 minutes at −4 to +32° without external cooling (room temperature 25-28°). Half of this (122 parts) serves as acid binding agent. The pH remains at 6.5-7.5 and, at most at the end of the addition, rises for a short time to 8.2. After half of the addition has been made, the remainder of the suspended cyanuric chloride dissolves. On completion of the primary substitution, two phases are formed: upper phase: 2,4-dichloro-6-ethylamino-s-triazine in methylethyl ketone; lower phase: aqueous solution of ethylamine hydrochloride with a little solvent.

Immediately afterwards, 363 parts of a 30% aqueous sodium hydroxide solution are added to the reaction mixture within 12-15 minutes while stirring. This sodium hydroxide serves to liberate the equivalent amount of ethylamine from the ethylamine hydrochloride formed in the first amination step described above. The temperature rises from 32 to 60°. The 2-chloro-4,6-bis-ethylamino-s-triazine begins to form good needles immediately after the beginning of the addition of the sodium hydroxide solution. Provided it is well stirred, the pH of the reaction mixture is always 8.5-9.0. Only the last about 5% of alkali raise the pH to 10-11. The reaction mixture is heated on a water bath of 90-100° to remove the solvent. The azeotropic mixture of about 88% ketone and 12% water begins to distil at 75°. The pH of the reaction mixture is 10-11. The distillate only contains traces of amine and the pH is 8.0-8.5.

Finally, 1000 parts by volume of water are poured in without external cooling whereupon the temperature drops from 95° to 65-60°. The aqueous suspension containing no solvent is filtered under suction. The filter residue is washed free of sodium chloride with 4000 parts by volume of water (silver nitrate sample), after which it is dried in vacuo at 80-110°. The yield of 2,4-bis-ethylamino-6-chloro-s-triazine is 265 parts=96% of the theoretical, calculated on the cyanuric chloride.

Example 5

250 parts of cyanuric chloride are added to 700 parts of ice and 800 parts of methylethyl ketone and the whole is stirred, whereupon the greater part of the cyanuric chloride dissolves. As soon as the temperature has dropped to 0 to −4°, 299 parts of aqueous 70% isopropylamine solution are poured in within 15-20 minutes at −4 to +32° without external cooling (room temperature 25-28°), while stirring well. On these 299 parts of amine solution, half (149.5 parts) serves as acid binding agent. The pH remains at 6.5-7.5 (brilliant paper neutral to orange) and at most at the end of the addition it rises for a short time to 8.2. After about half the amount of amine has been added, the remainder of the suspended cyanuric chloride dissolves. On completion of the primary substitution two phases are formed: upper layer: 2,4-dichloro-6-isopropylamino-s-triazine; lower layer: aqueous solution of isopropylamine hydrochloride with a little solvent.

Immediately afterwards, 365 parts of aqueous 30% sodium hydroxide solution are added to the reaction mixture within 10-15 minutes while stirring well. This sodium hydroxide serves to liberate the equimolar amount of isopropylamine from the isopropylamine hydrochloride formed in the first step described above. The temperature rises from 32° to 60-62°. The 2-chloro-4,6-bis-isopropylamino-s-triazine begins to crystallise into platelets after about half the alkali has been added. Up to almost the end, the pH of the reaction mixture is 8.5 to 9.0; the last 5% of the sodium hydroxide solution raise the pH to 10-11. The reaction mixture is heated on a water bath of 90-100° to remove the solvent. The azeotropic mixture of about 88% ketone and 12% water begins to distil at about 75°. The distillate only contains traces of amine and has a pH of 8.5 to 9.0. 1000 parts by volume of water are then added, without external cooling, to the distillation residue whereupon the temperature sinks from 95° to 60-65°. The aqueous suspension containing no solvent is quickly filtered under suction. The filter residue is washed completely free of sodium chloride with 4000 parts by volume of water (silver nitrate sample negative) and dried in vacuo at 80-110°. The yield of 2,4-bis-isopropylamino-6-chloro-s-triazine is 302 parts=92% of the theoretical, calculated on the cyanuric chloride.

The following 2 - chloro - 4,6 - bis - amino - s - triazine derivatives are obtained in the yields given (the yields are calculated on the cyanuric chloride used) on using cyanuric chloride and equivalent amounts of amine or amines in the manner described in Examples 1 to 5:

| | Yield, percent |
|---|---|
| 2 - chloro - 4,6 - bis(ethylamino) - s - triazine | 96 |
| 2 - chloro - 4,6 - bis(isopropylamino) - s - triazine | 96 |
| 2 - chloro - 4,6 - bis(allylamino) - s - triazine | |
| 2 - chloro - 4,6 - bis(γ - methoxypropylamino- s - triazine | 95 |
| 2 - chloro - 4 - isopropylamino - 6 - amino - s- triazine | 95 |
| 2 - chloro - 4 - methylamino - 6 - isopropylamino- s - triazine | 92 |
| 2 - chloro - 4 - ethylamino - 6 - isopropylamino- s - triazine | 98 |
| 2 - chloro - 4 - ethylamino - 6 - n - propylamino- s - triazine | 96-98 |
| 2 - chloro - 4 - ethylamino - 6 - diethylamino - s- triazine | 94 |
| 2 - chloro - 4 - isopropylamino - 6 - diethylamino- s - triazine | 95 |
| 2 - chloro - 4 - isopropylamino - 6 - (γ - methoxypropyl) - amino - s - triazine | 95 |
| 2 - chloro - 4 - ethylamino - 6 - sec.butylamino- s - triazine | 98 |
| 2 - chloro - 4 - ethylamino - 6 - tert.butylamino- s - triazine | 96.5 |
| 2 - chloro - 4 - isopropylamino - 6 - sec.butylamino - s - triazine | 94 |
| 2 - chloro - 4 - isopropylamino - 6 - tert.butylamino - s - triazine | 93 |
| 2 - chloro - 4 - allylamino - 6 - (γ - methoxypropyl)amino - s - triazine | 91 |
| 2 - chloro - 4 - allylamino - 6 - isopropylamino- s - triazine | 96-98 |
| 2 - chloro - 4 - isoamyl - 6 - (γ - methoxypropyl) amino - s - triazine | 98 |

| | Yield, percent |
|---|---|
| 2 - chloro - 4 - isopropylamino - 6 - isoamylamino- s - triazine | 99 |
| 2 - chloro - 4 - allylamino - 6 - sec.butylamino - s- triazine | 97 |
| 2 - chloro - 4 - allylamino - 6 - tert.butylamino - s- triazine | |
| 2 - chloro - 4 - n - propylamino - 6 - isopropyl- amino - s - triazine | 96 |
| 2 - chloro - 4 - ethylamino - 6 - methoxypropyl- amino - s - triazine | 97 |
| 2 - chloro - 4 - methylamino - 6 - n - propylamino- s - triazine | 97 |

Example 6

(a) 200 parts of commercial grade cyanuric chloride are added to a mixture of 1500 parts of ice cubes and 1200 parts of methylethyl ketone having a temperature of —6°. The addition is carried out with sufficiently strong stirring so as to prevent settling of larger cyanuric chloride particles at the bottom of the reaction vessel. There are then added immediately 196 parts of free 4,4- diamino - stilbene - 2,2' - disulfonic acid, and thereafter, without loss of time, 770 parts by volume of an aqueous solution containing 115 parts of sodium carbonate. Reaction ensues without formation of gel. The temperature is maintained below 0° throughout the reaction. Evolution of carbon dioxide is observed, and thorough stirring is continued for about 10 minutes at which time all diamino - stilbene - disulfonic acid is practically consumed as shown by the fact that carbon dioxide evolution ceases. The temperature should at this time not be higher than about —3°. The mixture is then warmed to 20° in order to expel dissolved carbon dioxide and, if necessary, to hydrolize and thereby eliminate any unreacted cyanuric chloride.

Similar salts are also obtained when using instead of 1200 parts of fresh methylethyl ketone (1500 parts by volume) about 1600 to 1700 parts by volume of methylethyl ketone recovered by distillation from a preceding run.

(b) To the reaction mixture obtained under (a) there are added first 57 parts of calcined sodium carbonate, and then rapidly pure aniline, whereupon the temperature of the mixture rises to 28°. The mixture is stirred until the bulk of carbon dioxide evolution is over, which requires about 10 to 15 minutes. The mixture is then heated to remove further carbon dioxide up to reflux temperature (internal temperature 73°). The pH of the reaction mixture has risen to 8.8 when gas evolution ceases. Temperature is allowed to drop to 70° (internal), whereupon the third stage is initiated immediately.

(c) To the reaction mixture obtained under (b) which still has a temperature of 68 to 70°, 100 parts of N- methyl - N($\beta$ - hydroxyethyl) - amine, whereupon the temperature rises again to the boiling point. The mixture is stirred until reflux decreases. Then about 60 parts of 95% calcined sodium carbonate is added. Distillation is begun immediately and within 40 to 50 minutes, about 1600 to 1700 parts by volume of an azeotropic methylethyl ketone-water mixture (about 73 to 100°) are distilled off. As soon as all solvent has been removed, crystallization of the optical brightener of the formula

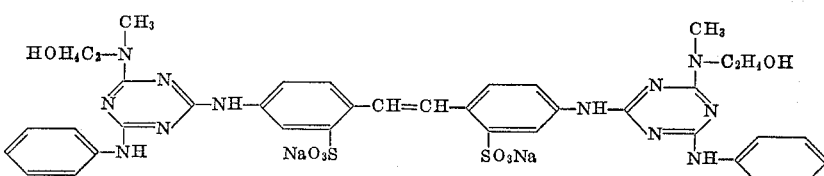

begins between 99 to 100°.

About 600 to 700 parts of dehardened water are added, the whole is left to cool to 30° and the final product is then repeated by filtration. The separated crystals are dried in vacuum during 24 hours on an oil bath having a temperature of 130°.

Similar salts are obtained when introducing the same amount of aniline as used above but into the first instead of the second stage, and the same amount of diamino- stilbene disulfonic acid as used above, but into the second stage in lieu of the first stage.

Similar salts are obtained when using in the second stage an equimolar amount of sodium 4,4' - diamino- stilbene - 2,2' - disulfonate instead of the free acid.

By repeating stage (a) of Example 6, but using in lieu of diamino - stilbene disulfonic acid an equivalent amount of metanilic acid or H - acid, correspondingly substituted s - triazine derivatives are obtained which are useful as dyestuff components in the production of fiber-reactive dyestuffs.

Such dyestuffs are also obtained when repeating stage (a) of Example 6, but introducing in lieu of diamino- stilbene disulfonic acid an equimolar amount of the free dyestuff acids or dyestuff components of the formulas given in the table below.

(1)

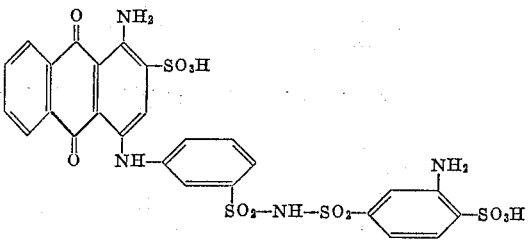

which affords the reactive dyestuff of the formula

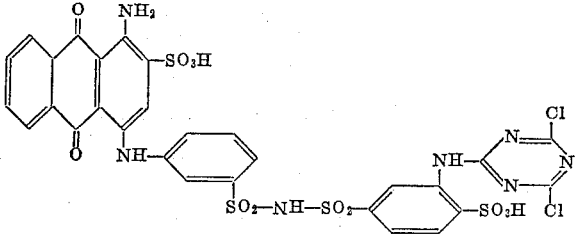

(2)

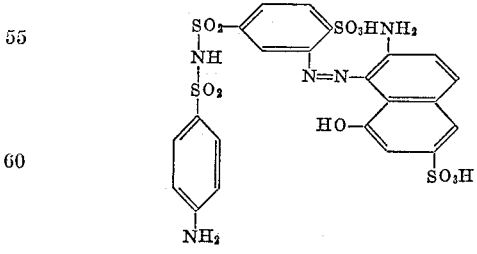

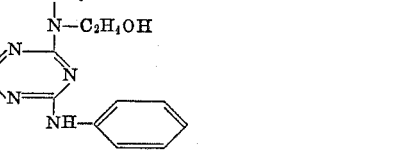

(3) 3,3' - diamino - diphenyl-1,1'-disulfimide-4-sulfonic acid.

(4) 1-aminobenzene-2,4-disulfonic acid.

(5) 1-aminobenzene-2,5-disulfonic acid.

(6) 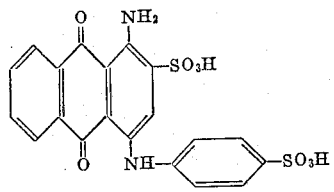

(7) 1 - amino - 8 - hydroxynaphthalene-3,6-disulfonic acid.
(8) 2-amino-8-hydroxynaphthalene-6-sulfonic acid.
(9) 2-amino-5-hydroxynapthalene-7-sulfonic acid.
(10) 1 - amino - 8 - hydroxynapthalene-4,6-disulfonic acid.
(11) 2-amino-5-hydroxynaphthalene-7-sulfonic acid.
(12) 1 - (3' - aminobenzoylamino)-8-hydroxynaphthalene-3,6-disulfonic acid.
(13) 2-amino-5-hydroxynaphthalene-7-sulfonic acid.

(14) 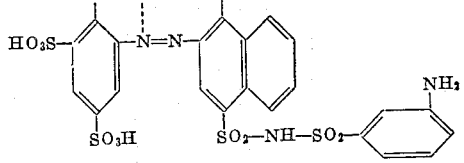

I claim:
1. In the production of 2-chloro-s-triazines substituted in at least one of the positions 4 and 6 of the triazine nucleus by an amino group, which production comprises reacting cyanuric chloride in an aqueous-organic medium with from one to two mols, per mol of cyanuric chloride, of an aminonitrogen containing reactant selected from the group consisting of primary and secondary organic amines in the presence of an acid binding agent in said medium, the improvement comprising performing the reaction betwen an amino-nitrogen containing member which is well soluble in at least one member selected from the class consisting of water and methylethyl ketone with cyanuric chloride in a reaction medium consisting essentially of a mixture of water and a partially water-soluble organic solvent having a boiling point in the range of from 50 to 120° C., which solvent is inert to the reaction partners.

2. The improvement as defined in claim 1, wherein said partially water-soluble solvent is an aliphatic ketone.

3. The improvement defined in claim 2, wherein said aliphatic ketone is methylethyl ketone.

4. The improvement defined in claim 1, wherein said cyanuric chloride is of technical grade.

5. In the production of 2-chloro-s-triazine substituted in at least one of the positions 4 and 6 of the triazine nucleus by an organically subsituted amino group, which production comprises reacting cyanuric chloride in an aqueous organic medium with from one to two mols, per mol of cyanuric chloride, of amino-nitrogen containing reactant selected from the class consisting of primary organic amines and secondary organic amines which amines are soluble in at least one of the two solvents water and methylethyl ketone, in the presence of an acid binding agent in said medium, the improvement consisting of
 (a) adding technical grade cyanuric chloride to a mixture of methylethyl ketone and ice having a pH below 7;
 (b) then adding, with sufficiently strong stirring to prevent settling of larger cyanuric chloride particles in a bottom zone, an organic amine which is well soluble in at least one of the solvents water and methylethyl ketone;
 (c) adding, not earlier than said organic amine, an acid binding agent selected from the class consisting of alkali metal carbonate, alkali metal hydroxide and an excess of said amine;
 (d) maintaining the temperature of the reaction mixture substantially throughout the ensuing reaction at below 0°, and
 (e) at the end of the reaction raising the temperature of the reaction mixture to room temperature,
thereby obtaining a reaction mixture containing 6-aminated 2,4-dichloro-s-triazine substantially free from byproducts aminated in 4 and 6 position and ready for amination of a second chlorine atom in said 2,4-dichloro compound by introduction of a second amine into said mixture.

6. The improvement defined in claim 5, wherein the amount of acid binding agent added under (c) is about equivalent to the amount of organic amine added under (b) and the amount of cyanuric chloride added under (a) is at least equivalent to the amount of organic amine added under (b).

7. The improvement defined in claim 5, wherein said acid binding agent is sodium carbonate.

8. The improvement defined in claim 5, wherein said acid binding agent is sodium hydroxide.

References Cited
UNITED STATES PATENTS 3,305,551   2/1967   Picklesimer _____ 260—248
3,328,399   6/1967   Prill _____ 260—249.8

JOHN D. RANDOLPH, *Primary Examiner.*

J. M. FORD, *Assistant Examiner.*